(12) United States Patent
Li et al.

(10) Patent No.: US 11,601,207 B2
(45) Date of Patent: Mar. 7, 2023

(54) METHOD FOR MEASURING POWER OF NON-CONSTANT ENVELOPE MODULATED SIGNAL, AND ELECTRONIC DEVICE

(71) Applicant: GENERAL TEST SYSTEMS INC., Guangdong (CN)

(72) Inventors: Jun Li, Guangdong (CN); Wei Yu, Guangdong (CN); Yihong Qi, Guangdong (CN)

(73) Assignee: GENERAL TEST SYSTEMS INC., Shenzhen (CN)

( * ) Notice: Subject to any disclaimer, the term of this patent is extended or adjusted under 35 U.S.C. 154(b) by 57 days.

(21) Appl. No.: 17/214,363

(22) Filed: Mar. 26, 2021

(65) Prior Publication Data
US 2021/0306082 A1   Sep. 30, 2021

(30) Foreign Application Priority Data
Mar. 27, 2020 (CN) .......................... 202010232210.9

(51) Int. Cl.
| | |
|---|---|
| H04L 27/36 | (2006.01) |
| H04B 17/13 | (2015.01) |
| H04B 17/00 | (2015.01) |
| H04B 17/21 | (2015.01) |
| H04B 1/04 | (2006.01) |

(52) U.S. Cl.
CPC .............. *H04B 17/13* (2015.01); *H04B 1/04* (2013.01); *H04B 17/0085* (2013.01); *H04B 17/21* (2015.01); *H04L 27/361* (2013.01); *H04L 27/366* (2013.01); *H04B 2001/045* (2013.01)

(58) Field of Classification Search
CPC . H04B 1/04; H04B 1/66; H04B 10/54; H04B 17/00; H04B 17/13; H04B 17/21; H04B 17/0085; H04L 25/03; H04L 27/00; H04L 27/06; H04L 27/36; H04L 27/361; H04L 27/366

USPC ....... 375/219, 260, 262, 267, 295–297, 316, 375/347
See application file for complete search history.

(56) References Cited

U.S. PATENT DOCUMENTS

| | | | |
|---|---|---|---|
| 8,639,196 B2 * | 1/2014 | Sorrells | H03F 1/32 455/116 |
| 2012/0321014 A1 * | 12/2012 | Maehata | H04J 11/0023 375/295 |
| 2018/0234139 A1 * | 8/2018 | Djordjevic | H01Q 3/28 |

* cited by examiner

*Primary Examiner* — Shawkat M Ali
(74) *Attorney, Agent, or Firm* — Hodgson Russ LLP

(57) ABSTRACT

The disclosure provides a method for measuring a power of a non-constant envelope modulated signal, an electronic device, and a computer readable storage medium. The method includes: sampling baseband I/Q data transmitted by a device under test to obtain sample data, in which a sampling duration is less than a length of a cycle of the non-constant envelope modulated signal; calculating a sample power within the sampling duration based on the sample data; matching in predetermined baseband I/Q data in the cycle based on the sample data to obtain a target baseband I/Q data segment; obtaining a power calibration value corresponding to the target baseband I/Q data segment; and obtaining an actual power of the non-constant envelope modulated signal in the cycle based on the power calibration value corresponding to the target baseband I/Q data segment and the sample power within the sampling duration.

20 Claims, 12 Drawing Sheets

METHOD FOR MEASURING POWER OF NON-CONSTANT ENVELOPE MODULATED SIGNAL, AND ELECTRONIC DEVICE

CROSS-REFERENCE TO RELATED APPLICATION

This application claims priority to Chinese Patent Application No. 202010232210.9, filed on Mar. 27, 2021, the entire contents of which is incorporated by reference herein.

TECHNICAL FIELD

The disclosure relates to the field of technologies for testing a performance of a wireless terminal device, and particularly to a method for measuring a power of a non-constant envelope modulated signal, an electronic device, and a computer readable storage medium.

BACKGROUND

At present, with regard to measuring a power of a non-constant envelope modulated signal, measuring the power in a short period of time will cause a larger error in a power measurement result, because an amplitude of peak value of the non-constant envelope modulated signal varies in a continuous cycle. Therefore, in the related art, a common measurement manner is to average power errors over a long period of time. However, this manner increases the measurement period, and may be not applicable to rapid batch measurement on the production line.

SUMMARY

In order to achieve the above purposes, a method for measuring a power of a non-constant envelope modulated signal proposed in embodiments of a first aspect of the disclosure may include: sampling baseband in-phase and quadrature I/Q data transmitted by a device under test to obtain sample data, in which a sampling duration is less than a length of a cycle of the non-constant envelope modulated signal; calculating a sample power within the sampling duration based on the sample data; matching in predetermined baseband I/Q data in the cycle based on the sample data to obtain a target baseband I/Q data segment; obtaining a power calibration value corresponding to the target baseband I/Q data segment; and obtaining an actual power of the non-constant envelope modulated signal in the cycle based on the power calibration value corresponding to the target baseband I/Q data segment and the sample power within the sampling duration.

In order to achieve the above purposes, a method for measuring a power of a non-constant envelope modulated signal proposed in embodiments of a second aspect of the disclosure may include: sampling baseband in-phase and quadrature I/Q data transmitted by a device under test to obtain sample baseband I/Q data, in which a sampling duration is less than a length of a cycle of the non-constant envelope modulated signal; decoding the sample baseband I/Q data to obtain sample binary data; calculating a sample power within the sampling duration based on the sample baseband I/Q data; matching in binary data transmitted by a transmitter of the device under test based on the sample binary data to obtain a target binary data segment; obtaining a power calibration value corresponding to the target binary data segment; and obtaining an actual power of the non-constant envelope modulated signal in the cycle based on the power calibration value corresponding to the target binary data segment and the sample power within the sampling duration.

To achieve the above purposes, an electronic device proposed in a third aspect of the disclosure includes: a memory, a processor, and a computer program stored on the memory and executable on the processor. When the processor executes the computer program, the method described in the first aspect of the disclosure is implemented, or, the method described in the second aspect of the disclosure is implemented.

To achieve the above purposes, a computer readable storage medium proposed in a fourth aspect of the disclosure is stored with a computer program thereon. When the computer program is executed by a processor, the processor is caused to perform the method described in the first aspect of the disclosure or the method described in the second aspect of the disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the disclosure will become obvious and easy to understand from the following description of the embodiments in combination with the accompanying drawings, in which.

DETAILED DESCRIPTION

Figure 1:
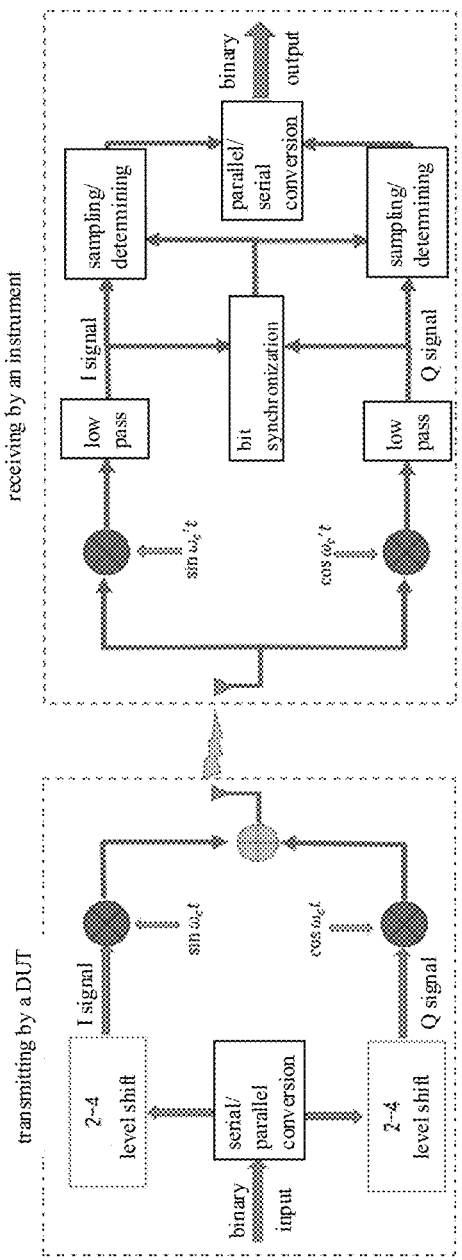
FIG. 1 is a schematic diagram of a DUT (device under test) as a transmitter, and an instrument for power measurement and demodulation.

Reference will now be made in detail to exemplary embodiments, examples of which are illustrated in the accompanying drawings. The same or similar elements and the elements having same or similar functions are denoted by like reference numerals throughout the descriptions unless otherwise represented. The embodiments described herein with reference to drawings are explanatory, illustrative, and used to generally understand the disclosure. The embodiments shall not be construed to limit the disclosure.

A wireless terminal device may not be sold to market unless tested in the production process. During the production line test of the production process, a wireless transceiving performance of the wireless terminal device may be important. The wireless transceiving performance may determine a communication quality of the wireless terminal device and real experience of users. The current production line test of the wireless terminal device may test the transceiving performance of the wireless terminal device, which may test a receipt signal level and a transmitting power of the wireless terminal device to ensure consistency, reliability and stability of the wireless terminal device put on the market.

In the existing wireless terminal test, the power measurement is an indispensable link. The transmitting power and the receiving capacity of the wireless terminal may be carried out in the laboratory research and development as well as in the large-scale production line test. With the advent of 5th Generation Mobile Network (5G) communication system, in order to ensure the higher wireless communication rate and the reliability, the number of antennas involved in the wireless terminal device may be increased, and the frequency ranges may also be increased. In addition to Wireless Fidelity (Wi-Fi) antennas and mobile communication antennas of the 2nd Generation Mobile Communication Technology (2G)~the 4th Generation Mobile Communication Technology (4G), multiple 5G antennas are added, and frequency bands of 5G antennas are also added, which leads to a significant increase in test workload. For a mobile signal, it may focus on 4G Long Term Evolution (LTE) and 5G test. With the development of 4G and 5G, there are higher requirements for the measurement accuracy and the measurement speed of mobile phones. In 2G era, for some simple modulation modes such as Minimum Shift Keying (MSK) and Gaussian Filtered Minimum Shift Keying (GMSK), all modulated signals are constant envelope signals. The amplitude of peak value of these signals remains unchanged in a continuous period. However, for the measurement signals of the current WIFI, LTE and even 5G, Quadrature Phase Shift Keying (QPSK), 16-QAM (Quadrature Amplitude Modulation), 64-QAM, 256-QAM or OFDM (Orthogonal Frequency Division Multiplexing) modulated signals are adopted, which belong to non-constant envelope signals, of which the amplitude of peak value keeps changing in a continuous period. The power measurement within a short period of time will cause a large error in a power measurement result. Therefore, the common measurement manner is to average the measurement errors brought by the non-constant envelope measurement through the long-term measurement. However, this manner increases the measurement period, and may be not applicable to rapid batch measurement on the production line.

The following examples illustrate the method for measuring the power of the non-constant envelope in the related art.

Taking the 5G NR (New Radio) 20 MHz bandwidth signal and 16-QAM modulation mode for example, FIG. 1 is a schematic diagram of a DUT (device under test) as a transmitter, and an instrument for power measurement and demodulation. As illustrated in FIG. 1, in the 16-QAM modulation, a binary signal is converted into a baseband I/Q digital signal and transmitted through the antenna after up-conversion. After down-conversion and low-pass filtering (LPF) at the receiving end of the instrument, it is converted into a baseband I/Q signal and finally output as the binary signal.

Figure 2:
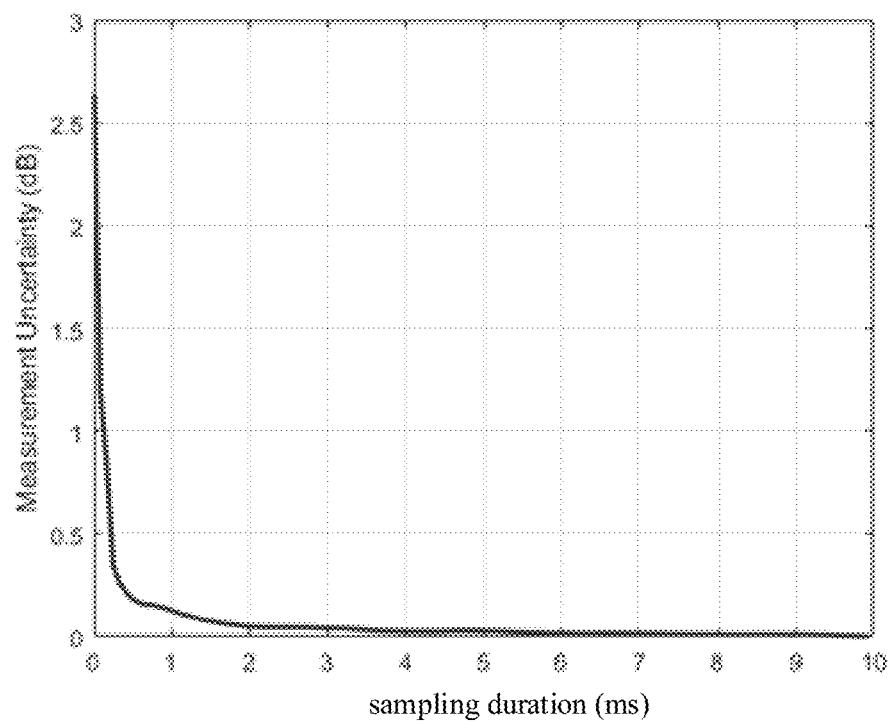
FIG. 2 is a schematic diagram of a measurement accuracy curve under different sampling durations.

In the conventional instrument power measurement, the power of the I/Q signal at the receiving end is usually calculated. Generally, in the calculation process, the power of the I/Q signal is calculated by sampling within a certain duration. Taking the 5G NR 20 MHz bandwidth signal for example, one periodic signal is 10 ms (milliseconds), and sampling accuracy varies with sampling durations. FIG. 2 is a schematic diagram of a measurement accuracy curve under different sampling durations. As illustrated in FIG. 2, with increase of sampling durations, the error of power calculation with sampling points gradually decreases (which is denoted by the measurement uncertainty), of which several typical values may be illustrated in Table 1 as below:

TABLE 1

| number of sampling points | sampling duration | measurement error (dB) |
| --- | --- | --- |
| 1228 | ≈≈10 us | 2.53 |
| 12288 | 100 us | 0.54 |
| 122880 | 1 ms | 0.13 |
| 245760 | 2 ms | 0.075 |
| 368640 | 3 ms | 0.051 |
| 614400 | 5 ms | 0.026 |
| 1228800 | 10 ms | 0.0002 |

From the above Table 1, it may be found that in order to make the measurement error within 0.05, the sampling duration theoretically at least exceeds 3 ms. In the presence of noise interference, the sampling duration required for the accurate measurement may be longer. Eliminating the influence on the power error caused by the non-constant envelope through the long sampling duration and averaging may lead to the long measurement period in the large-scale production lines and the low measurement efficiency.

To reduce the power measurement period and enhance the measurement efficiency, a rapid method, an apparatus, an electronic device and a storage medium for measuring a power of a non-constant envelope modulated signal are proposed in the disclosure. In detail, the method, the apparatus, the electronic device and the storage medium for measuring the power of the non-constant envelope modulated signal may be described with reference to the drawings as below.

Figure 3:
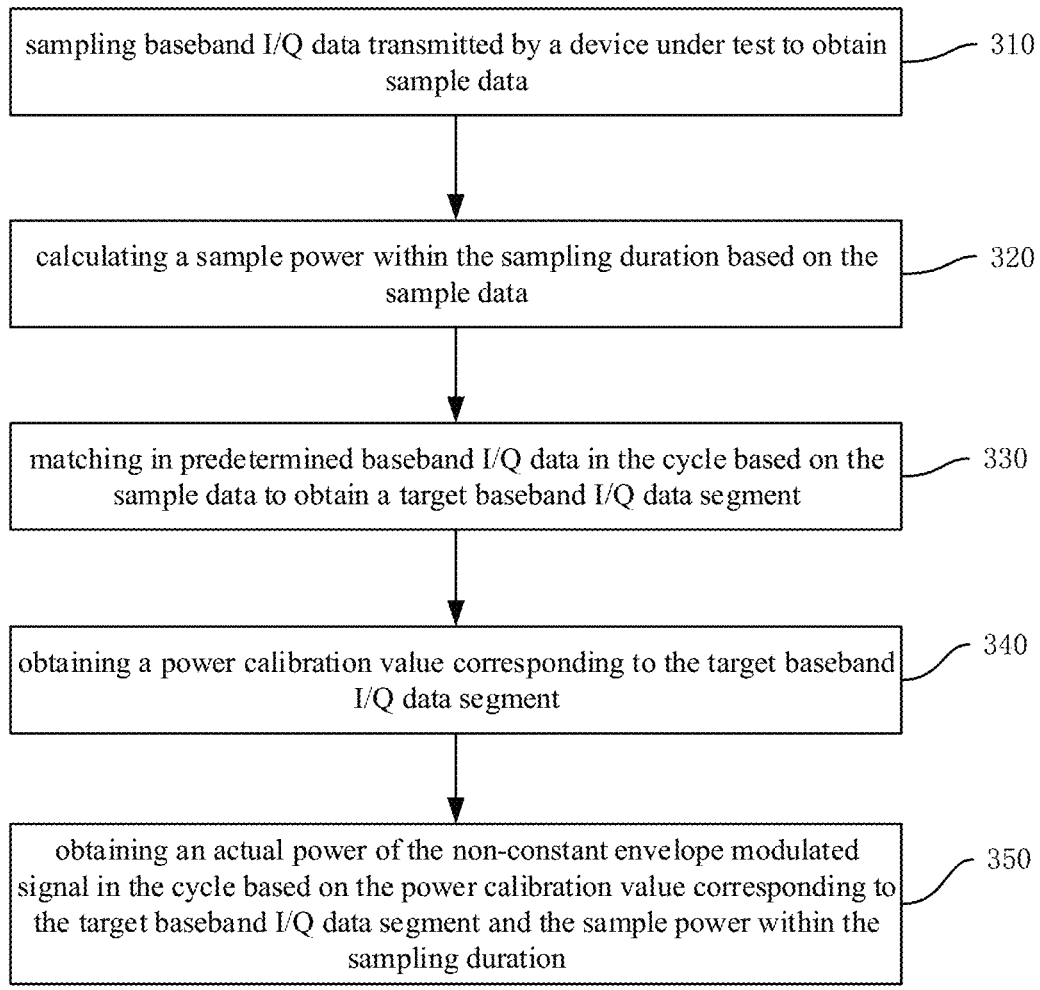
FIG. 3 is a flowchart of a method for measuring a power of a non-constant envelope modulated signal according to embodiments of the disclosure.

FIG. 3 is a flowchart of a method for measuring a power of a non-constant envelope modulated signal according to embodiments of the disclosure. As illustrated in FIG. 3, the may include the following.

At block 310, sample data are obtained by sampling baseband I/Q data transmitted by the DUT, in which the sampling duration is less than a length of a cycle of the non-constant envelope modulated signal. As an example, the DUT may be the wireless terminal device with wireless antennas, for example, a mobile terminal.

For example, it is assumed that the method for measuring the power of the non-constant envelope modulated signal in the embodiments of the disclosure may be applicable to an electronic device with the function of testing the wireless performance of the DUT. For example, the electronic device may be an instrument power measurement device. The baseband I/Q data transmitted by the DUT may be sampled through the electronic device to obtain the sample data, in which the sampling duration is less than the length of the cycle of the non-constant envelope modulated signal. As an example, the sampling duration is less than one tenth of the length of the cycle of the non-constant envelope modulated signal.

The above sampling duration may be 300 μs (microseconds). It may be seen that, in this example, the sampling duration is 300 μs, which is a relatively short period of time. That is, the baseband I/Q data transmitted by the DUT may be sampled within a relatively short sampling duration, to obtain a baseband I/Q data segment sampled within the sampling duration.

It should be noted that, the above baseband I/Q data may be understood as I signal and Q signal data of a baseband in the DUT.

At block 320, a sample power within the sampling duration is calculated based on the sample data.

For example, the sample power within the above sampling duration is calculated based on the above sample data. In embodiments of the disclosure, the power calculation formula may be as follows: $Power_{Sample}=20*\log[\text{mean}(\text{abs}(Sample_{IQ1}))]$, where, $Power_{Sample}$ is the above sample power; $Sample_{IQ1}$ is the sample data collected within the above sampling duration; abs( ) is an absolute value function; mean( ) is an average function; and log( ) is a logarithmic function.

At block 330, a target baseband I/Q data segment is obtained by matching in predetermined baseband I/Q data in the cycle based on the sample data.

Optionally, the above predetermined baseband I/Q data may be divided into multiple baseband I/Q data segments by taking quantity of sample values in the sample data as a unit (that is, each baseband I/Q data segment has the same quantity of data as the sample data), and the above target baseband I/Q data segment may be obtained by matching in the multiple baseband I/Q data segments according to the above sample data. That is, the above sample data may be used as a matching unit, and each baseband data in this matching unit may be matched in the baseband I/Q data in the cycle. The matched baseband I/Q data segment may be the above target baseband I/Q data segment.

In embodiments of the disclosure, the matching algorithm may be adopted to match the target baseband I/Q data segment from the above multiple baseband I/Q data segments through the above sample data. The matching algorithm may be the matching by calculating a minimum value of variances, or by calculating a minimum value of sums of differences, or by adopting other matching algorithms, for example, similarity matching, which are not defined in the disclosure.

As an example of a possible implementation, the implementation process of obtaining the target baseband I/Q data segment by matching in the multiple baseband I/Q data segments according to the sample data may include: calculating a sum of differences between each sample value in the sample data and each I/Q data in each baseband I/Q data segment to obtain multiple sums of differences; and determining a minimum value of the multiple sums of differences, and determining a baseband I/Q data segment corresponding to the minimum value of the multiple sums of differences as the target baseband I/Q data segment.

Optionally, the multiple sums of differences are obtained by calculating the sum of differences between each sample value in the sample data and each I/Q data in each baseband I/Q data segment according to the following summation formula. The baseband I/Q data segment corresponding to the minimum value of the multiple sums of differences may be determined as the target baseband I/Q data segment. The above summation formula may be as follow: $Sum=\Sigma\{\text{abs}(\text{abs}(Sample_{IQ1})-\text{abs}(Source_{IQi}))\}$, where Sum is the sum of differences, $Sample_{IQ1}$ is the sample data collected within the above sampling duration, and $Source_{IQi}$ is the $i^{th}$ baseband I/Q data segment.

Figure 4:
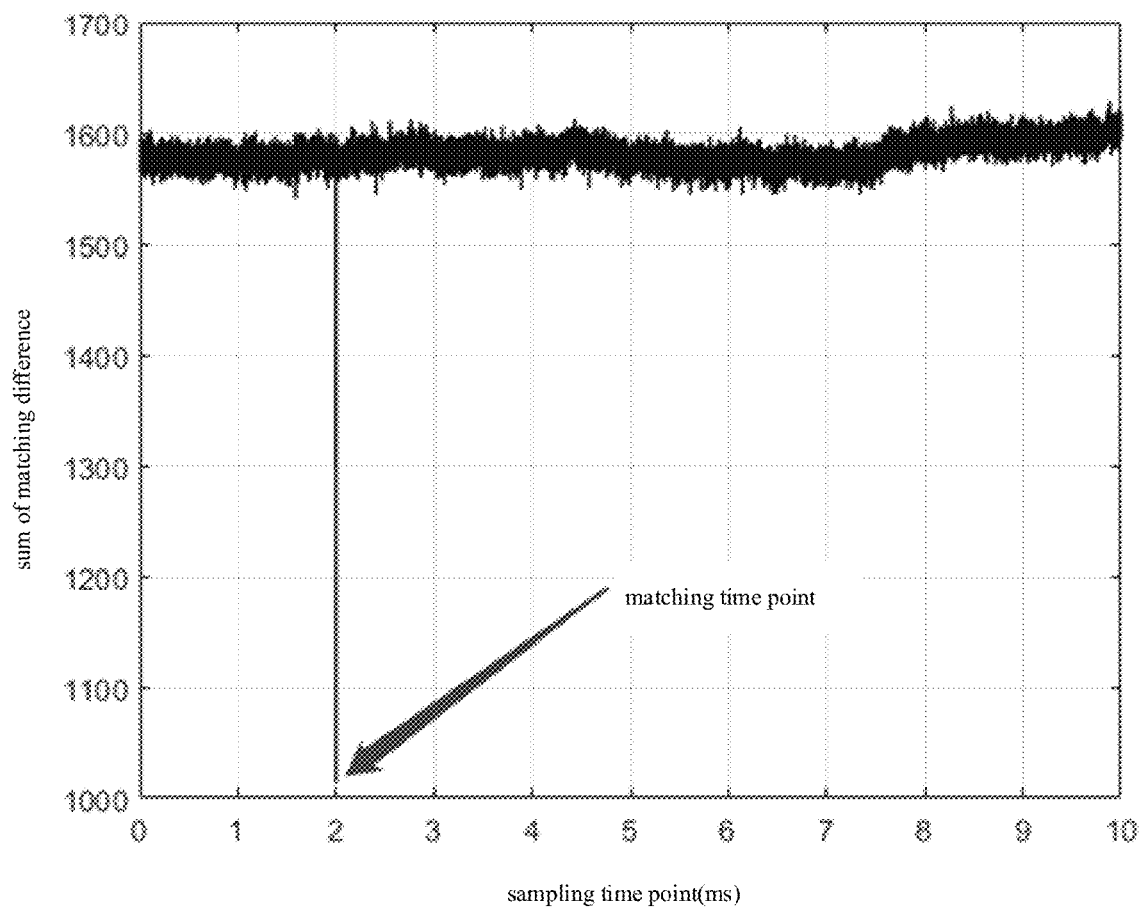
FIG. 4 is a schematic diagram of matching of a target baseband I/Q data segment according to embodiments of the disclosure.

For example, it is assumed that the entire non-constant envelope signal is 10 ms, there are 10000 baseband I/Q data in the signal and 1000 sample values in the above sample data. In this example, the above 1000 sample values may be matched in the 10000 baseband I/Q data. For example, 10000 baseband I/Q data may be divided into ten 1000 baseband I/Q data. Ten sums of differences are obtained by calculating the sum of differences between the above 1000 sample values and each of the above ten 1000 baseband I/Q data. Then, the minimum value may be determined from the ten sums of differences, and the baseband I/Q data segment corresponding to the minimum value of the sums of differences is the matched target baseband I/Q data segment. For example, the baseband I/Q data in the above cycle may be the baseband I/Q data collected at any sampling time of the above sampling duration. Therefore, according to different time points, the baseband I/Q data in the cycle may be divided into the multiple baseband I/Q data segments. As illustrated in FIG. 4, at the matching point, the minimum value of the sums of differences between each sample value in the sample data and each I/Q data in the baseband I/Q data segment will have large pits, and the baseband I/Q data segment corresponding to the pits is the matched target baseband I/Q data segment.

As another example of a possible implementation, the implementation process of obtaining the target baseband I/Q data segment by matching in the multiple baseband I/Q data segments according to the sample data may include: performing variance calculation based on each sample value in the sample data and each I/Q data in each baseband I/Q data segment to obtain multiple variances; and determining a minimum value of the multiple variances, and determining a baseband I/Q data segment corresponding to the minimum value of the multiple variances as the target baseband I/Q data segment.

For example, it is assumed that the entire non-constant envelope signal is 10 ms, there are 10000 baseband I/Q data in the signal and 1000 sample values in the above sample data. In this example, the above 1000 sample values may be matched in the 10000 baseband I/Q data. For example, 10000 baseband I/Q data may be divided into ten 1000 baseband I/Q data. In this way, ten variances are obtained by calculating the variance between the above 1000 sample values and each of the above ten 1000 baseband I/Q data. Then, the minimum value may be determined from the ten variances, and the baseband I/Q data segment corresponding to the minimum value of the variances is the matched target baseband I/Q data segment.

At block 340, a power calibration value corresponding to the target baseband I/Q data segment is obtained.

Optionally, the power calibration value corresponding to the target baseband I/Q data segment is determined from power calibration values corresponding to multiple baseband I/Q data sample segments based on the target baseband I/Q data segment. It is understandable that the power calibration values corresponding to the above multiple baseband I/Q data sample segments may be obtained by calculation in advance, and the detailed implementation process may refer to descriptions of subsequent embodiments.

At block 350, an actual power of the non-constant envelope modulated signal in the cycle based on the power calibration value corresponding to the target baseband I/Q data segment and the sample power within the sampling duration.

Optionally, a difference obtained by subtracting the power calibration value corresponding to the target baseband I/Q data segment from the sample power within the sampling duration is determined as the actual power. That is, the sample data in a short period of time may be obtained by short-time sampling, and the matching may be performed based on the sample data in the short period of time to obtain the corresponding power calibration value. Then, the power in the above short period of time is calibrated based on the power calibration value, thus obtaining the actual power, and quickly and accurately calculating the total power in the cycle under short-time sampling, which may be applicable to the power measurement of the non-constant envelope modulated signals such as 4G LTE, 5G NR and WIFI.

Figure 5:
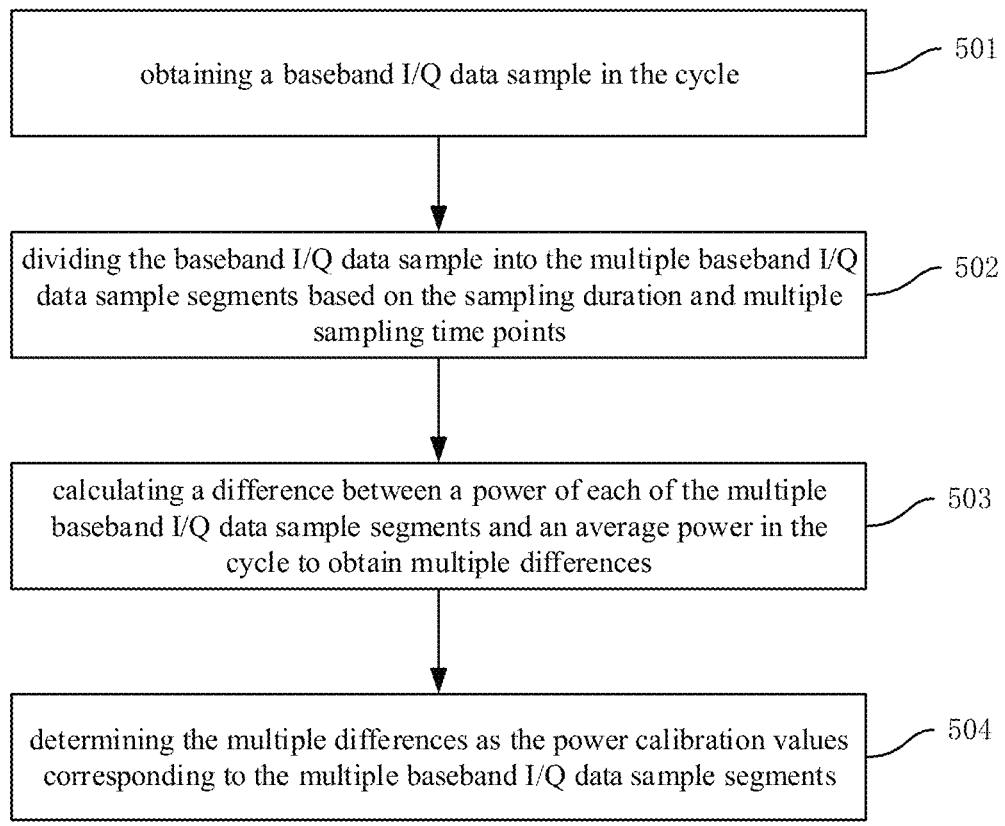
FIG. 5 is a flowchart of obtaining power calibration values corresponding to multiple baseband I/Q data sample segments according to embodiments of the disclosure.

It should be noted that the power calibration values corresponding to the above multiple baseband I/Q data sample segments may be obtained by calculation in advance. As an example, as illustrated in FIG. 5, the power calibration values corresponding to the above multiple baseband I/Q data sample segments may be obtained in the following way.

At block 501, a baseband I/Q data sample in the cycle is obtained.

As an example, baseband I/Q data transmitted by the original DUT may be obtained by sampling within the data cycle, in which the data cycle may be the length of the cycle of the non-constant envelope signal. As another example, the baseband I/Q data sample in the cycle, required by power calibration, may be pre-negotiated. For example, it may be negotiated with the manufacturer of the DUT, and the baseband I/Q data within a certain cycle may be the above baseband I/Q data sample in the cycle.

At block 502, the baseband I/Q data sample is divided into the multiple baseband I/Q data sample segments based on the sampling duration and multiple sampling time points.

That is, the baseband I/Q data sample in the cycle is divided into the multiple baseband I/Q data sample segments based on the sampling duration and the multiple sampling time points. The above baseband I/Q data sample segments each may be understood as baseband I/Q data obtained by sampling based on the above sampling duration at the corresponding sampling time points.

At block 503, a difference between a power of each of the multiple baseband I/Q data sample segments and an average power in the cycle is calculated to obtain multiple differences.

That is, the power of each baseband I/Q data sample segment may be calculated by power calculation formula. The power calculation formula may be: $Power_{sample_i} = 20*\log[mean(abs(Sample_{IQi}))]$, where, $Power_{sample_i}$ is the power of the $i^{th}$ baseband I/Q data sample segment, and $Sample_{IQi}$ is the $i^{th}$ baseband I/Q data sample segment.

At this block, the above required average power in the cycle may be calculated by the following power calculation formula. The power calculation formula may be: $Power_{Source} = 20*\log[mean(abs(Source_{IQ}))]$, where, $Power_{Source}$ is the above required average power in the cycle, $Source_{IQ}$ is the above required baseband I/Q data sample in the cycle.

After the powers of the above multiple baseband I/Q data sample segments and the average power in the cycle required are obtained, multiple differences may be obtained by subtracting the average power in the cycle required from the powers of the multiple baseband I/Q data sample segments.

At block 504, the multiple differences are determined as the power calibration values corresponding to the multiple baseband I/Q data sample segments.

It may be seen that the power calibration values corresponding to the multiple baseband I/Q data sample segments may be obtained through the above blocks 501 to 504, so as to facilitate calibration of the sample power in the short period of time based on the power calibration values, thus rapidly obtaining the relatively accurate actual power in the cycle.

With the method for measuring the power of the non-constant envelope modulated signal in embodiments of the disclosure, the baseband I/Q data transmitted by the DUT may be sampled to obtain the sample data, in which the sampling duration is less than the length of the cycle of the non-constant envelope modulated signal, and then the sample power within the sampling duration is calculated based on the sample data; the sample data may be matched in baseband I/Q data in the cycle to obtain the target baseband I/Q data segment; the power calibration value corresponding to the target baseband I/Q data segment is obtained, and then the actual power in the cycle is obtained based on the power calibration value corresponding to the target baseband I/Q data segment and the sample power within the sampling duration. That is, the power of the cycle may be calculated and calibrated by matching based on the baseband I/Q data, thereby solving power measurement errors caused by the non-constant envelope, which may reduce the measurement period to a large extent, ensure the measurement accuracy, improve the power measurement efficiency, and reduce the measurement cost.

Figure 6:
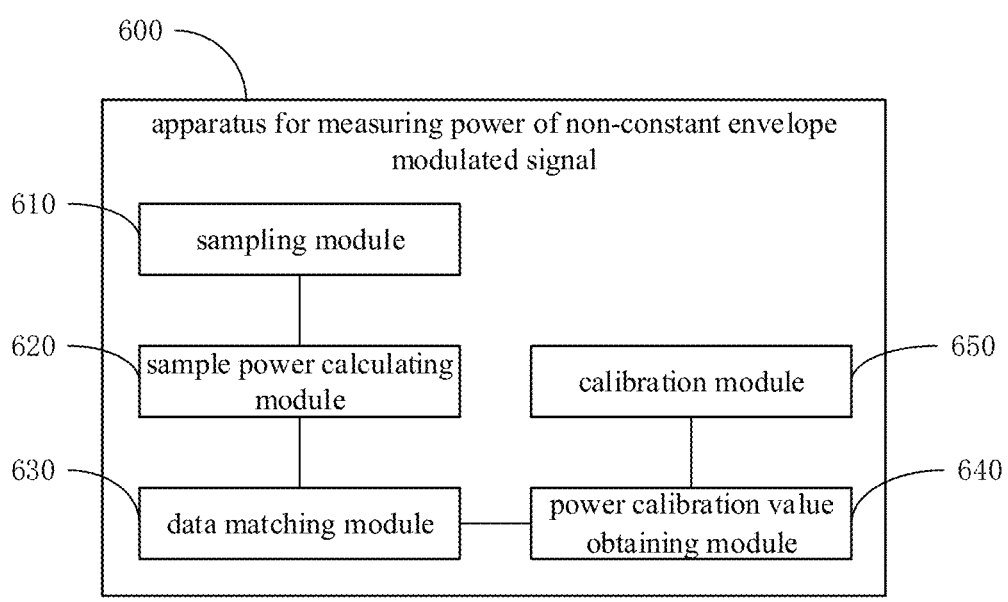
FIG. 6 is a block diagram of an apparatus for measuring a power of a non-constant envelope modulated signal according to embodiments of the disclosure.

Corresponding to the method for measuring the power of the non-constant envelope modulated signal provided by the above embodiments (that is, embodiments in FIGS. 3 to 5), embodiments of the disclosure also provides an apparatus for measuring a power of a non-constant envelope modulated signal. The apparatus for measuring the power of the non-constant envelope modulated signal provided in the embodiments of the disclosure corresponds the method for measuring the power of the non-constant envelope modulated signal provided in the above several embodiments (that is, embodiments in FIGS. 3 to 5) of the disclosure. Therefore, the implementation of the method for measuring the power of the non-constant envelope modulated signal may also be applicable to the apparatus for measuring the power of the non-constant envelope modulated signal provided in the embodiments of the disclosure, which will not be described in detail in the embodiments. FIG. 6 is a block diagram of an apparatus for measuring a power of a non-constant envelope modulated signal according to embodiments of the disclosure. As illustrated in FIG. 6, the apparatus 600 for measuring the power of the non-constant envelope modulated signal may include: a sampling module 610, a sample power calculating module 620, a data matching module 630, a power calibration value obtaining module 640 and, a calibration module 650.

Specifically, the sampling module 610 is configured to sample baseband in-phase and quadrature I/Q data transmitted by a device under test to obtain sample data, in which a sampling duration is less than a length of a cycle of the non-constant envelope modulated signal. As an example, the sampling duration is less than one tenth of the length of the cycle of the non-constant envelope modulated signal.

The sample power calculating module 620 is configured to calculate a sample power within the sampling duration based on the sample data.

The data matching module 630 is configured to match in predetermined baseband I/Q data in the cycle based on the sample data to obtain a target baseband I/Q data segment. Optionally, the data matching module 630 is configured to: divide the predetermined baseband I/Q data into multiple baseband I/Q data segments by taking quantity of sample values in the sample data as a unit (that is, each baseband I/Q data segment has the same quantity of data as the sample data); and obtain the target baseband I/Q data segment by matching in the multiple baseband I/Q data segments according to the sample data.

As an example, the implementation process that the data matching module 630 obtains the target baseband I/Q data segment by matching in the multiple baseband I/Q data segments according to the sample data by actions of: calculating a sum of differences between each sample value in the sample data and each I/Q data in each baseband I/Q data segment to obtain multiple sums of differences; and determining a minimum value of the multiple sums of differences, and determining a baseband I/Q data segment corresponding to the minimum value of the multiple sums of differences as the target baseband I/Q data segment.

As another example, the implementation process that the data matching module 630 obtains the target baseband I/Q data segment by matching in the multiple baseband I/Q data segments according to the sample data by actions of: performing variance calculation based on each sample value in the sample data and each I/Q data in each baseband I/Q data segment to obtain multiple variances; and determining a minimum value of the multiple variances, and determining a baseband I/Q data segment corresponding to the minimum value of the multiple variances as the target baseband I/Q data segment.

The power calibration value obtaining module 640 is configured to obtain a power calibration value corresponding to the target baseband I/Q data segment. As an example, the power calibration value obtaining module 640 is configured to determine the power calibration value corresponding to the target baseband I/Q data segment from power calibration values corresponding to multiple baseband I/Q data sample segments based on the target baseband I/Q data segment.

The calibration module 650 is configured to obtain an actual power of the non-constant envelope modulated signal in the cycle based on the power calibration value corresponding to the target baseband I/Q data segment and the sample power within the sampling duration. As an example, the calibration module 650 is configured to: determine a difference obtained by subtracting the power calibration value corresponding to the target baseband I/Q data segment from the sample power within the sampling duration, as the actual power.

Figure 7:
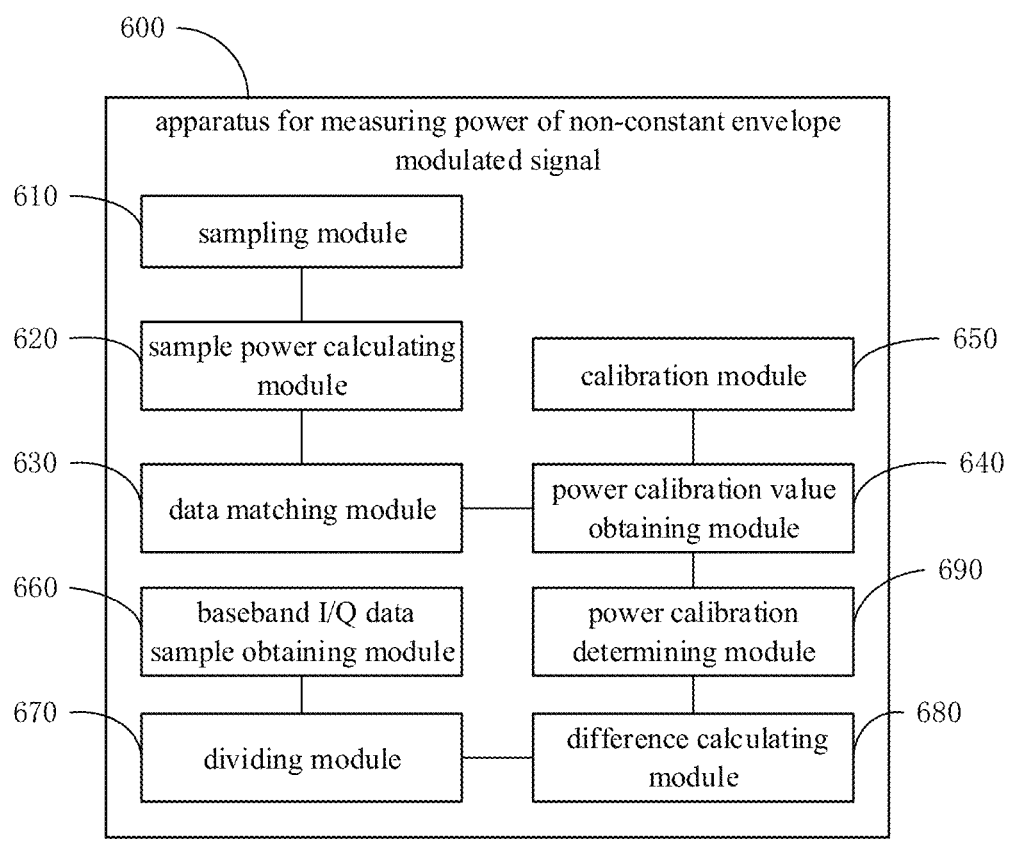
FIG. 7 is a block diagram of an apparatus for measuring a power of a non-constant envelope modulated signal according to embodiments of the disclosure.

In embodiments of the disclosure, as illustrated in FIG. 7, the apparatus further includes: a baseband I/Q data sample obtaining module 660, a dividing module 670, a difference calculating module 680 and a power calibration determining module 690. The baseband I/Q data sample obtaining module 660 is configured to obtain a baseband I/Q data sample in the cycle; the dividing module 670 is configured to divide the baseband I/Q data sample into the multiple baseband I/Q data sample segments based on the sampling duration and multiple sampling time points; the difference calculating module 680 is configured to calculate a difference between a power of each of the multiple baseband I/Q data sample segments and an average power in the cycle to obtain multiple differences; the power calibration value determining module 690 is configured to determine the multiple differences as the power calibration values corresponding to the multiple baseband I/Q data sample segments.

With the apparatus for measuring the power of the non-constant envelope modulated signal in embodiments of the disclosure, the baseband I/Q data transmitted by the DUT may be sampled to obtain the sample data, in which the sampling duration is less than the length of the cycle of the non-constant envelope modulated signal, and then the sample power within the sampling duration is calculated based on the sample data; the sample data may be matched in baseband I/Q data in the cycle to obtain the target baseband I/Q data segment; the power calibration value corresponding to the target baseband I/Q data segment is obtained, and then the actual power in the cycle is obtained based on the power calibration value corresponding to the target baseband I/Q data segment and the sample power within the sampling duration. That is, the power in the cycle may be calculated and calibrated by matching based on the baseband I/Q data, thereby solving power measurement errors caused by the non-constant envelope, which may reduce the measurement period to a large extent, ensure the measurement accuracy, improve the power measurement efficiency, and reduce the measurement cost.

The disclosure further proposes another method for measuring a power of a non-constant envelope modulated signal.

Figure 8:
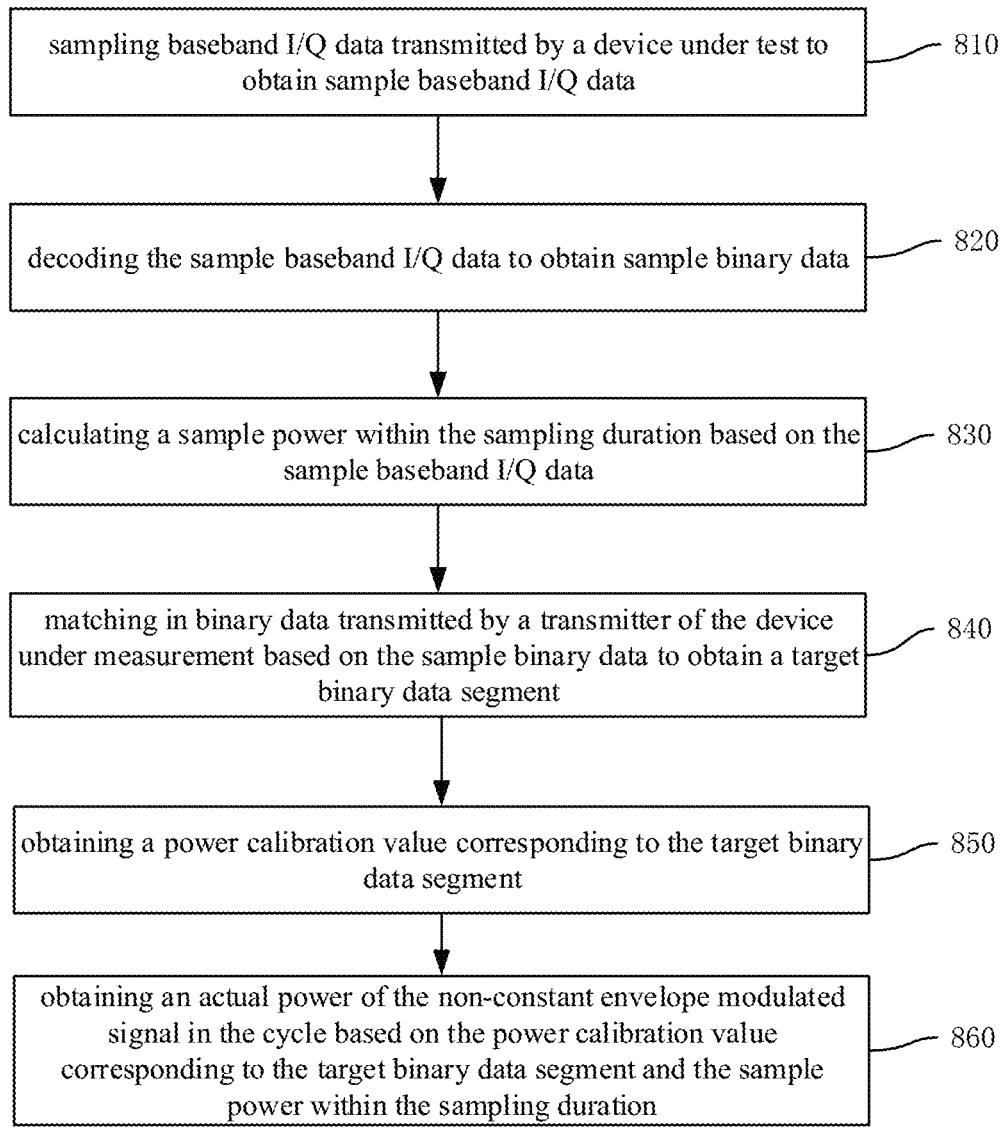
FIG. 8 is a flowchart of a method for measuring a power of a non-constant envelope modulated signal according to embodiments of the disclosure.

FIG. 8 is a flowchart of a method for measuring a power of a non-constant envelope modulated signal according to embodiments of the disclosure. As illustrated in FIG. 8, the may include the following.

At block 810, baseband I/Q data transmitted by the DUT is sampled to obtain sample baseband I/Q data, in which the sampling duration is less than a length of a cycle of the non-constant envelope modulated signal.

For example, it is assumed that the method for measuring the power of the non-constant envelope modulated signal in the embodiments of the disclosure may be applicable to an electronic device with the function of testing the wireless performance of the DUT. For example, the electronic device may be an instrument power measurement device. The baseband I/Q data transmitted by the DUT may be sampled through the electronic device to obtain the sample baseband I/Q data, in which the sampling duration is less than the length of the cycle of the non-constant envelope modulated signal. As an example, the sampling duration is less than one tenth of the length of the cycle of the non-constant envelope modulated signal.

The above sampling duration may be 300 μs (microseconds). It may be seen that, in this example, the sampling duration is 300 μs, which is a relatively short period of time. That is, the baseband I/Q data transmitted by the DUT may be sampled within a relatively short sampling duration, to obtain a baseband I/Q data segment sampled within the sampling duration.

It should be noted that, the above baseband I/Q data may be understood as I signal and Q signal data of a baseband in the DUT.

At block 820, the sample baseband I/Q data is decoded to obtain sample binary data.

At block 830, a sample power within the sampling duration is calculated based on the sample baseband I/Q data.

For example, the sample power within the above sampling duration is calculated by the above sample baseband I/Q data according to the power calculation formula.

At block 840, a target binary data segment is obtained by matching in binary data transmitted by a transmitter of the device under test based on the sample binary data.

That is, the binary data transmitted by the transmitter in the DUT is known. In this way, the above sample binary data may be matched in the binary data transmitted by the transmitter in the DUT, so that the binary data segment same with the above sample binary data in the binary data transmitted by the transmitter in the DUT may be the target binary data segment matched.

At block 850, a power calibration value corresponding to the target binary data segment is obtained.

Optionally, the power calibration value corresponding to the target binary data segment is determined from power calibration values corresponding to multiple binary data sample segments based on the target binary data segment. It should be noted that the power calibration values corresponding to the above multiple binary data sample segments may be obtained by calculation in advance, and the detailed implementation process may refer to descriptions of subsequent embodiments.

At block 860, an actual power of the non-constant envelope modulated signal in the cycle is obtained based on the power calibration value corresponding to the target binary data segment and the sample power within the sampling duration.

Optionally, a difference obtained by subtracting the power calibration value corresponding to the target binary data segment from the sample power within the sampling duration is determined as the actual power. That is, the output binary data segment in a short period of time may be obtained through short-time sampling, and the matching may be performed based on the output binary data segment in the short period of time to obtain the corresponding power calibration value. Then, the power in the above short period of time is calibrated based on the power calibration value, thus obtaining the actual power in the cycle. The total power in the cycle may be quickly and accurately calculated by short-time sampling, which may be applicable to the power measurement of the non-constant envelope modulated signals such as 4G LTE, 5G NR and WIFI.

Figure 9:
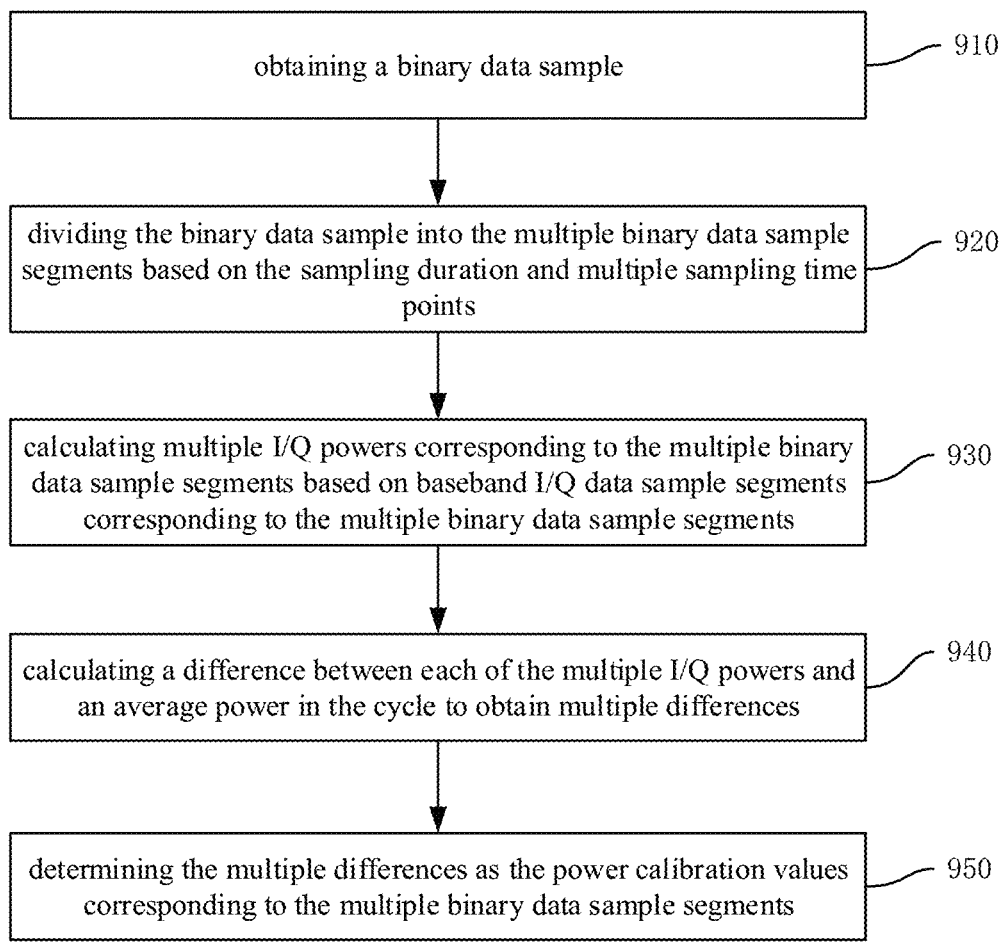
FIG. 9 is a flowchart of a method for measuring a power of a non-constant envelope modulated signal according to embodiments of the disclosure.

It should be noted that the power calibration values corresponding to the above multiple binary data sample segments may be obtained by calculation in advance. As an example, as illustrated in FIG. 9, the power calibration values corresponding to the above multiple binary data sample segments may be obtained in the following way.

At block 910, a binary data sample is obtained.

At block 920, the binary data sample is divided into the multiple binary data sample segments based on the sampling duration and multiple sampling time points.

That is, the required binary data sample is divided into the multiple binary data sample segments based on the sampling duration and multiple sampling time points. The above binary data sample segments may be understood as binary data obtained by sampling within the above sampling duration at the corresponding sampling time points.

At block 930, multiple I/Q powers corresponding to the multiple binary data sample segments are calculated based on baseband I/Q data sample segments corresponding to the multiple binary data sample segments.

For example, the I/Q power corresponding to each binary data sample segment may be calculated based on the baseband I/Q data sample segment corresponding to each binary data sample segment according to the power calculation formula.

At block 940, a difference between each of the multiple I/Q powers and an average power in the cycle is calculated to obtain multiple differences.

For example, after the average power in the cycle is calculated according to the power calculation formula, the multiple differences may be obtained by subtracting the average power in the cycle from the above I/Q powers.

At block 950, the multiple differences are determined as the power calibration values corresponding to the multiple binary data sample segments.

It may be seen that the power calibration values corresponding to the multiple binary data sample segments may be obtained through the above blocks 910 to 950, so as to facilitate calibration of the sample power in the short period of time based on the power calibration values, thus rapidly obtaining the relatively accurate actual power in the cycle.

With the method for measuring the power of the non-constant envelope modulated signal in embodiments of the disclosure, the baseband I/Q data transmitted by the DUT may be sampled to obtain the sample baseband I/Q data, in which the sampling duration is less than the length of the cycle of the non-constant envelope modulated signal, the sample baseband I/Q data is decoded to obtain the sample binary data, and the sample power within the sampling duration is calculated based on the sample baseband I/Q data. Then, the target binary data segment may be obtained by matching the sample binary data in the binary data transmitted by the transmitter in the DUT, and the power calibration value corresponding to the target binary data segment is obtained. The actual power in the cycle is obtained based on the power calibration value corresponding to the target binary data segment and the sample power within the sampling duration. That is, the power in the cycle may be calculated and calibrated by matching based on binary source data through short-time sampling, thereby solving power measurement errors caused by the non-constant envelope, which may reduce the measurement period to a large extent, ensure the measurement accuracy, improve the power measurement efficiency, and reduce the measurement cost.

Figure 10:
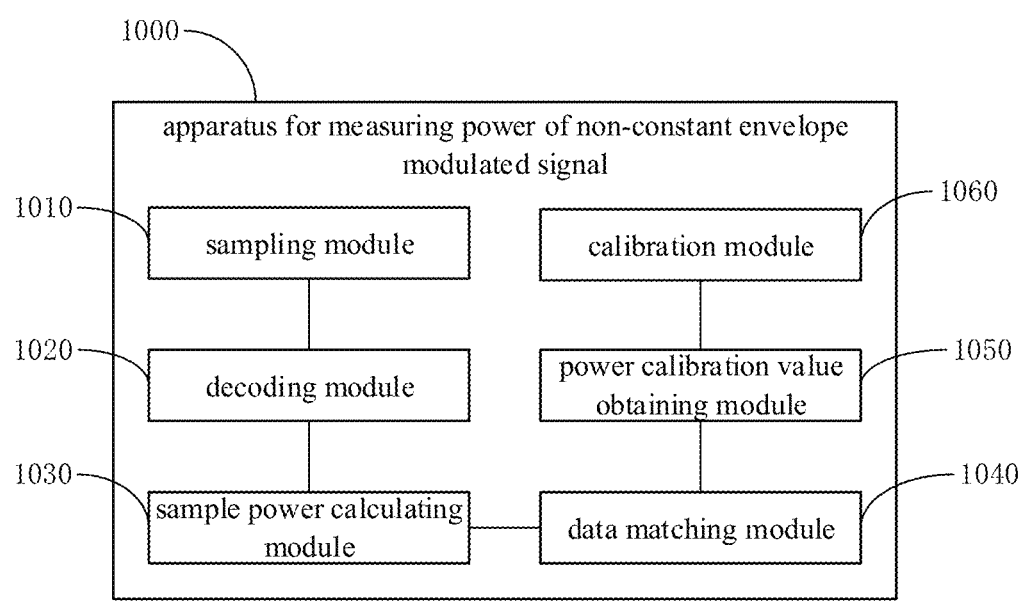
FIG. 10 is a block diagram of an apparatus for measuring a power of a non-constant envelope modulated signal according to embodiments of the disclosure.

Corresponding to the method for measuring the power of the non-constant envelope modulated signal provided by the above embodiments (that is, embodiments in FIGS. 8 to 9), embodiments of the disclosure also provides an apparatus for measuring a power of a non-constant envelope modulated signal. The apparatus for measuring the power of the non-constant envelope modulated signal provided in the embodiments of the disclosure corresponds the method for measuring the power of the non-constant envelope modulated signal provided in the above several embodiments (that is, embodiments in FIGS. 8 to 9) of the disclosure. Therefore, the implementation of the method for measuring the power of the non-constant envelope modulated signal may also be applicable to the apparatus for measuring the power of the non-constant envelope modulated signal provided in the embodiments of the disclosure, which will not be described in detail in the embodiments. FIG. 10 is a block diagram of an apparatus for measuring a power of a non-constant envelope modulated signal according to embodiments of the disclosure. As illustrated in FIG. 10, the apparatus 1000 for measuring the power of the non-constant envelope modulated signal may include: a sampling module 1010, a decoding module 1020, a sample power calculating module 1030, a data matching module 1040, a power calibration value obtaining module 1050, and a calibration module 1060.

Specifically, the sampling module 1010 is configured to sample baseband in-phase and quadrature I/Q data transmitted by a device under test to obtain sample baseband I/Q data, in which a sampling duration is less than a length of a cycle of the non-constant envelope modulated signal. As an example, the sampling duration is less than one tenth of the length of the cycle of the non-constant envelope modulated signal.

The decoding module 1020 is configured to decode the sample baseband I/Q data to obtain sample binary data.

The sample power calculating module 1030 is configured to calculate a sample power within the sampling duration based on the sample baseband I/Q data.

The data matching module 1040 is configured to match in binary data transmitted by a transmitter of the device under test based on the sample binary data to obtain a target binary data segment.

The power calibration value obtaining module 1050 is configured to obtain a power calibration value corresponding to the target binary data segment. Optionally, the power calibration value obtaining module 1050 is configured to: determine the power calibration value corresponding to the target binary data segment from power calibration values corresponding to multiple binary data sample segments based on the target binary data segment.

The calibration module 1060 is configured to obtain an actual power of the non-constant envelope modulated signal in the cycle based on the power calibration value corresponding to the target binary data segment and the sample power within the sampling duration. As an example, the calibration module 1060 is configured to: determine a difference obtained by subtracting the power calibration value corresponding to the target binary data segment from the sample power within the sampling duration, as the actual power.

Figure 11:
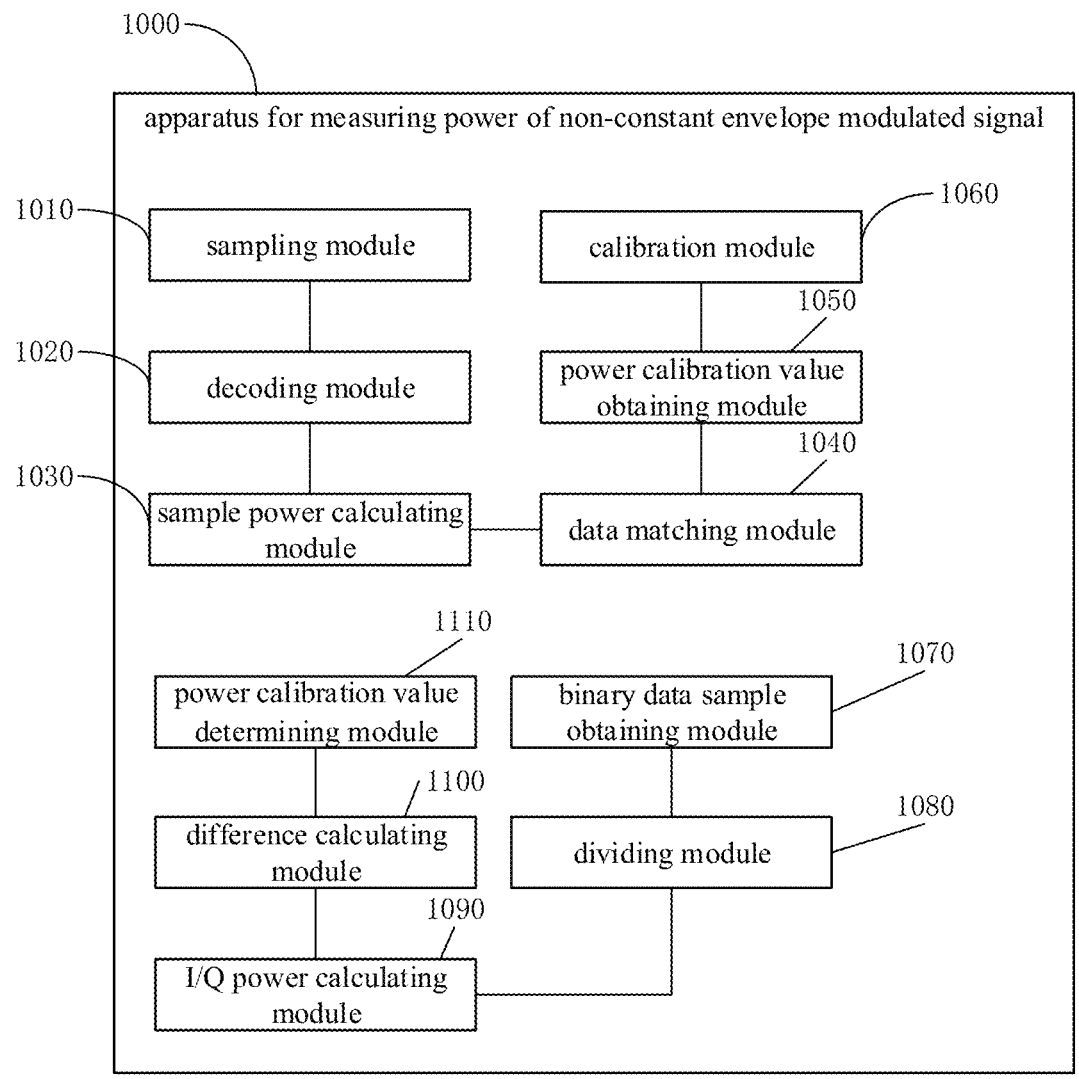
FIG. 11 is a block diagram of an apparatus for measuring a power of a non-constant envelope modulated signal according to embodiments of the disclosure.

In embodiments of the disclosure, as illustrated in FIG. 11, the apparatus 1000 may further include: a binary data sample obtaining module 1070, a dividing module 1080, an I/Q power calculating module 1090, a difference calculating module 1100, and a power calibration value determining module 1110. The binary data sample obtaining module 1070 is configured to obtain a binary data sample; the dividing module 1080 is configured to divide the binary data sample into the multiple binary data sample segments based on the sampling duration and multiple sampling time points; the I/Q power calculating module 1090 is configured to calculate multiple I/Q powers corresponding to the multiple binary data sample segments based on baseband I/Q data sample segments corresponding to the multiple binary data sample segments; the difference calculating module 1100 is configured to calculate a difference between each of the multiple I/Q powers and an average power in the cycle to obtain multiple differences; the power calibration value determining module 1110 is configured to determine the multiple differences as the power calibration values corresponding to the multiple binary data sample segments.

With the apparatus for measuring the power of the non-constant envelope modulated signal in embodiments of the disclosure, the baseband I/Q data transmitted by the DUT may be sampled to obtain the sample baseband I/Q data, in which the sampling duration is less than the length of the cycle of the non-constant envelope modulated signal, the sample baseband I/Q data is decoded to obtain the sample binary data, and the sample power within the sampling duration is calculated based on the sample baseband I/Q data. Then, the target binary data segment may be obtained by matching the sample binary data in the binary data transmitted by the transmitter in the DUT, and the power calibration value corresponding to the target binary data segment is obtained. The actual power in the cycle is obtained based on the power calibration value corresponding to the target binary data segment and the sample power within the sampling duration. That is, the power in the cycle may be calculated and calibrated by matching based on binary source data through short-time sampling, thereby solving power measurement errors caused by the non-constant envelope, which may reduce the measurement period to a large extent, ensure the measurement accuracy, improve the power measurement efficiency, and reduce the measurement cost.

To achieve the above embodiments, the disclosure further proposes an electronic device.

Figure 12:
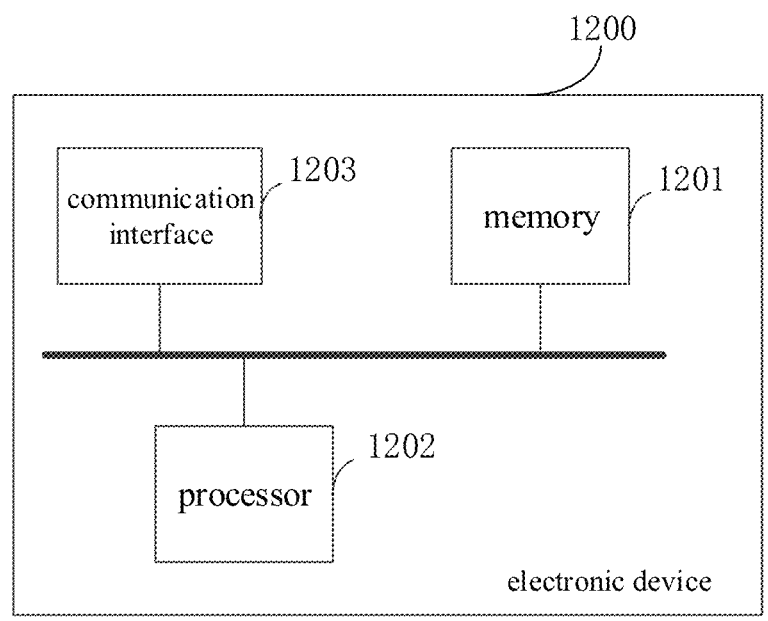
FIG. 12 is a block diagram of an electronic device according to embodiments of the disclosure.

FIG. 12 is a block diagram of an electronic device according to embodiments of the disclosure. As illustrated in FIG. 12, the electronic device 1200 may include: a memory 1201, a processor 1202, and a computer program stored on the memory 1201 and executable on the processor 1202.

The processor 1202 implements the method for measuring the power of the non-constant envelope modulated signal provided in the above embodiments when executing the above computer program.

Furthermore, the electronic device 1200 includes: a communication interface 1203, configured to store communication between a memory 1201 and a processor 1202; a memory 1201, configured to store a computer program run on the processor 1202.

The memory 1201 may include a high speed RAM (random access memory) memory, and may also include a non-volatile memory, for example at least one disk memory.

The processor 1202 is configured to implement the method for measuring the power of the non-constant envelope modulated signal provided in the above embodiments when executing the above computer program.

If the memory 1201, the processor 1202 and the communication interface 1203 are implemented independently, the communication interface 1203, the memory 1201 and the processor 1202 may be inter-connected through a bus to complete communication between each other. A bus may be an Industry Standard Architecture (ISA) bus, a Peripheral Component (PCI) bus and an Extended Industry Standard Architecture (EISA) bus, etc. A bus may be divided into an address bus, a data bus and a control bus. For convenience of representation, it is represented only with a thick line in FIG. 12, but it doesn't mean that there's only one bus or one type of bus.

Optionally, in the specific implementation, if the memory 1201, the processor 1202 and the communication interface 1203 are integrated on one chip and implemented, the memory 1201, the processor 1202 and the communication interface 1203 may inter-communicated through an internal interface.

The processor may be a Central Processing Unit (CPU), or an Application Specific Integrated Circuit (ASIC), or one or more integrated circuits configured to implement embodiments of the disclosure.

A computer readable storage medium with a computer program stored thereon is further provided in the disclosure, which implements the method for measuring the power of the non-constant envelope modulated signal described in any of the embodiments of the disclosure when the computer program is executed by the processor.

It should be understood that "a plurality of" or "multiple" means two or more than two, unless specified otherwise, for example two, three.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. It should be understood that, although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for measuring a power of a non-constant envelope modulated signal, the method comprising:
   sampling baseband in-phase and quadrature (I/Q) data transmitted by a device under test to obtain sample data, wherein a sampling duration is less than a length of a cycle of the non-constant envelope modulated signal;
   calculating a sample power within the sampling duration based on the sample data;
   matching in predetermined baseband I/Q data in the cycle based on the sample data to obtain a target baseband I/Q data segment;
   obtaining a power calibration value corresponding to the target baseband I/Q data segment; and
   obtaining an actual power of the non-constant envelope modulated signal in the cycle based on the power calibration value corresponding to the target baseband I/Q data segment and the sample power within the sampling duration.

2. The method of claim 1, wherein, matching in the predetermined baseband I/Q data in the cycle based on the sample data to obtain the target baseband I/Q data segment, comprises:
   dividing the predetermined baseband I/Q data into multiple baseband I/Q data segments, wherein each baseband I/Q data segment has the same quantity of data as the sample data; and
   obtaining the target baseband I/Q data segment by matching in the multiple baseband I/Q data segments according to the sample data.

3. The method of claim 2, wherein, obtaining the target baseband I/Q data segment by matching in the multiple baseband I/Q data segments according to the sample data, comprises:
  calculating a sum of differences between each sample value in the sample data and each I/Q data in each baseband I/Q data segment to obtain multiple sums of differences; and
  determining a minimum value of the multiple sums of differences, and determining a baseband I/Q data segment corresponding to the minimum value of the multiple sums of differences as the target baseband I/Q data segment.

4. The method of claim 2, wherein, obtaining the target baseband I/Q data segment by matching in the multiple baseband I/Q data segments according to the sample data, comprises:
  performing variance calculation based on each sample value in the sample data and each I/Q data in each baseband I/Q data segment to obtain multiple variances; and
  determining a minimum value of the multiple variances, and determining a baseband I/Q data segment corresponding to the minimum value of the multiple variances as the target baseband I/Q data segment.

5. The method of claim 1, wherein, obtaining the power calibration value corresponding to the target baseband I/Q data segment, comprises:
  determining the power calibration value corresponding to the target baseband I/Q data segment from power calibration values corresponding to multiple baseband I/Q data sample segments based on the target baseband I/Q data segment.

6. The method of claim 5, wherein, the power calibration values corresponding to the multiple baseband I/Q data sample segments are obtained by actions of:
  obtaining a baseband I/Q data sample in the cycle;
  dividing the baseband I/Q data sample into the multiple baseband I/Q data sample segments based on the sampling duration and multiple sampling time points;
  calculating a difference between a power of each of the multiple baseband I/Q data sample segments and an average power in the cycle to obtain multiple differences; and
  determining the multiple differences as the power calibration values corresponding to the multiple baseband I/Q data sample segments.

7. The method of claim 1, wherein, obtaining the actual power of the non-constant envelope modulated signal in the cycle based on the power calibration value corresponding to the target baseband I/Q data segment and the sample power within the sampling duration, comprises:
  determining a difference obtained by subtracting the power calibration value corresponding to the target baseband I/Q data segment from the sample power within the sampling duration, as the actual power.

8. The method of claim 1, wherein, the sampling duration is less than one tenth of the cycle length of the non-constant envelope modulated signal.

9. A method for measuring a power of a non-constant envelope modulated signal, the method comprising:
  sampling baseband in-phase and quadrature (I/Q) data transmitted by a device under test to obtain sample baseband I/Q data, wherein a sampling duration is less than a length of a cycle of the non-constant envelope modulated signal;
  decoding the sample baseband I/Q data to obtain sample binary data;
  calculating a sample power within the sampling duration based on the sample baseband I/Q data;
  matching in binary data transmitted by a transmitter of the device under test based on the sample binary data to obtain a target binary data segment;
  obtaining a power calibration value corresponding to the target binary data segment; and
  obtaining an actual power of the non-constant envelope modulated signal in the cycle based on the power calibration value corresponding to the target binary data segment and the sample power within the sampling duration.

10. The method of claim 9, wherein, obtaining the power calibration value corresponding to the target binary data segment, comprises:
  determining the power calibration value corresponding to the target binary data segment from power calibration values corresponding to multiple binary data sample segments based on the target binary data segment.

11. The method of claim 10, wherein, the power calibration values corresponding to the multiple binary data sample segments are obtained by actions of:
  obtaining a binary data sample;
  dividing the binary data sample into the multiple binary data sample segments based on the sampling duration and multiple sampling time points;
  calculating multiple I/Q powers corresponding to the multiple binary data sample segments based on baseband I/Q data sample segments corresponding to the multiple binary data sample segments;
  calculating a difference between each of the multiple I/Q powers and an average power in the cycle to obtain multiple differences; and
  determining the multiple differences as the power calibration values corresponding to the multiple binary data sample segments.

12. The method of claim 9, wherein, obtaining the actual power of the non-constant envelope modulated signal in the cycle based on the power calibration value corresponding to the target binary data segment and the sample power within the sampling duration, comprises:
  determining a difference obtained by subtracting the power calibration value corresponding to the target binary data segment from the sample power within the sampling duration, as the actual power.

13. The method of claim 9, wherein, the sampling duration is less than one tenth of the cycle length of the non-constant envelope modulated signal.

14. An electronic device comprising:
  a processor; and
  a memory for storing instructions executable by the processor;
  wherein the processor is configured, executing the instructions, to:
    sample baseband in-phase and quadrature (I/Q) data transmitted by a device under test to obtain sample data, wherein a sampling duration is less than a length of a cycle of a non-constant envelope modulated signal;
    calculate a sample power within the sampling duration based on the sample data;
    match in predetermined baseband I/Q data in the cycle based on the sample data to obtain a target baseband I/Q data segment;

obtain a power calibration value corresponding to the target baseband I/Q data segment; and obtain an actual power of the non-constant envelope modulated signal in the cycle based on the power calibration value corresponding to the target baseband I/Q data segment and the sample power within the sampling duration.

15. The electronic device of claim 14, wherein the processor is further configured, executing the instructions, to:

divide the predetermined baseband I/Q data into multiple baseband I/Q data segments, wherein each baseband I/Q data segment has the same quantity of data as the sample data; and obtain the target baseband I/Q data segment by matching in the multiple baseband I/Q data segments according to the sample data.

16. The electronic device of claim 15, wherein the processor is further configured, executing the instructions, to:

calculate a sum of differences between each sample value in the sample data and each I/Q data in each baseband I/Q data segment to obtain multiple sums of differences; and determine a minimum value of the multiple sums of differences, and determine a baseband I/Q data segment corresponding to the minimum value of the multiple sums of differences as the target baseband I/Q data segment.

17. The electronic device of claim 15, wherein the processor is further configured, executing the instructions, to:

perform variance calculation based on each sample value in the sample data and each I/Q data in each baseband I/Q data segment to obtain multiple variances; and determine a minimum value of the multiple variances, and determine a baseband I/Q data segment corresponding to the minimum value of the multiple variances as the target baseband I/Q data segment.

18. The electronic device of claim 14, wherein the processor is further configured, executing the instructions, to:

determine the power calibration value corresponding to the target baseband I/Q data segment from power calibration values corresponding to multiple baseband I/Q data sample segments based on the target baseband I/Q data segment.

19. The electronic device of claim 18, wherein the processor is further configured, executing the instructions, to:

obtain a baseband I/Q data sample in the cycle;

divide the baseband I/Q data sample into the multiple baseband I/Q data sample segments based on the sampling duration and multiple sampling time points;

calculate a difference between a power of each of the multiple baseband I/Q data sample segments and an average power in the cycle to obtain multiple differences; and determine the multiple differences as the power calibration values corresponding to the multiple baseband I/Q data sample segments.

20. The electronic device of claim 14, wherein the processor is further configured, executing the instructions, to:

determine a difference obtained by subtracting the power calibration value corresponding to the target baseband I/Q data segment from the sample power within the sampling duration, as the actual power.

* * * * *